United States Patent [19]

Stark

[11] Patent Number: 5,320,523

[45] Date of Patent: Jun. 14, 1994

[54] BURNER FOR HEATING GAS STREAM

[75] Inventor: Terrance L. Stark, Washington, Mich.

[73] Assignee: General Motors Corporation, Detroit, Mich.

[21] Appl. No.: 936,467

[22] Filed: Aug. 28, 1992

[51] Int. Cl.⁵ ............................................. F01N 3/10
[52] U.S. Cl. ...................................... 431/353; 60/303; 431/5; 431/158
[58] Field of Search .................. 60/300, 303; 431/353, 431/350, 5, 158

[56] References Cited

U.S. PATENT DOCUMENTS

| | | | |
|---|---|---|---|
| 3,070,150 | 12/1962 | Hunter et al. | 431/353 X |
| 3,738,816 | 6/1973 | Hirt | 431/5 X |
| 3,759,668 | 9/1973 | Yamada et al. | 60/303 X |
| 4,381,643 | 5/1983 | Stark | 60/303 |
| 4,383,411 | 5/1983 | Riddel | 60/303 |
| 4,481,767 | 11/1984 | Stark | 60/303 |
| 4,502,278 | 3/1985 | Stark | 60/303 |
| 4,651,524 | 3/1987 | Brightons | 60/303 X |
| 4,677,823 | 7/1987 | Hardy | 60/274 |
| 4,744,217 | 5/1988 | Goerlich et al. | 60/303 |
| 4,840,028 | 6/1989 | Kusada et al. | 60/303 |
| 4,987,738 | 1/1991 | Lopez-Crevillen et al. | 60/286 |
| 5,063,737 | 11/1991 | Lopez-Crevillen et al. | 60/286 |
| 5,140,814 | 8/1992 | Kreutmair et al. | 60/303 |

FOREIGN PATENT DOCUMENTS

| | | | |
|---|---|---|---|
| 0306743 | 5/1989 | European Pat. Off. | 60/303 |
| 0000517 | 1/1984 | Japan | 60/303 |

Primary Examiner—Carl D. Price
Attorney, Agent, or Firm—Karl F. Barr

[57] ABSTRACT

A burner for heating a gas stream is disclosed having a primary combustor mounted coaxially within a main combustor to form an assembly. The assembly is coaxially mounted within a burner housing and defines a gas flow space between the assembly and the housing. Gas enters the housing upstream of a substantial portion of the assembly and flows axially over the exterior thereof, picking up heat rejected from the assembly as it travels axially through the housing to an outlet area of a reduced diameter which defines a mixing zone. In the mixing zone, burner output and excess air are introduced to the gas stream in a manner so that the inputs are injected into the exhaust stream in a direction which has a normal component to the direction of gas flow thereby assuring adequate mixing and a resultant even distribution of heat in the flow.

3 Claims, 6 Drawing Sheets

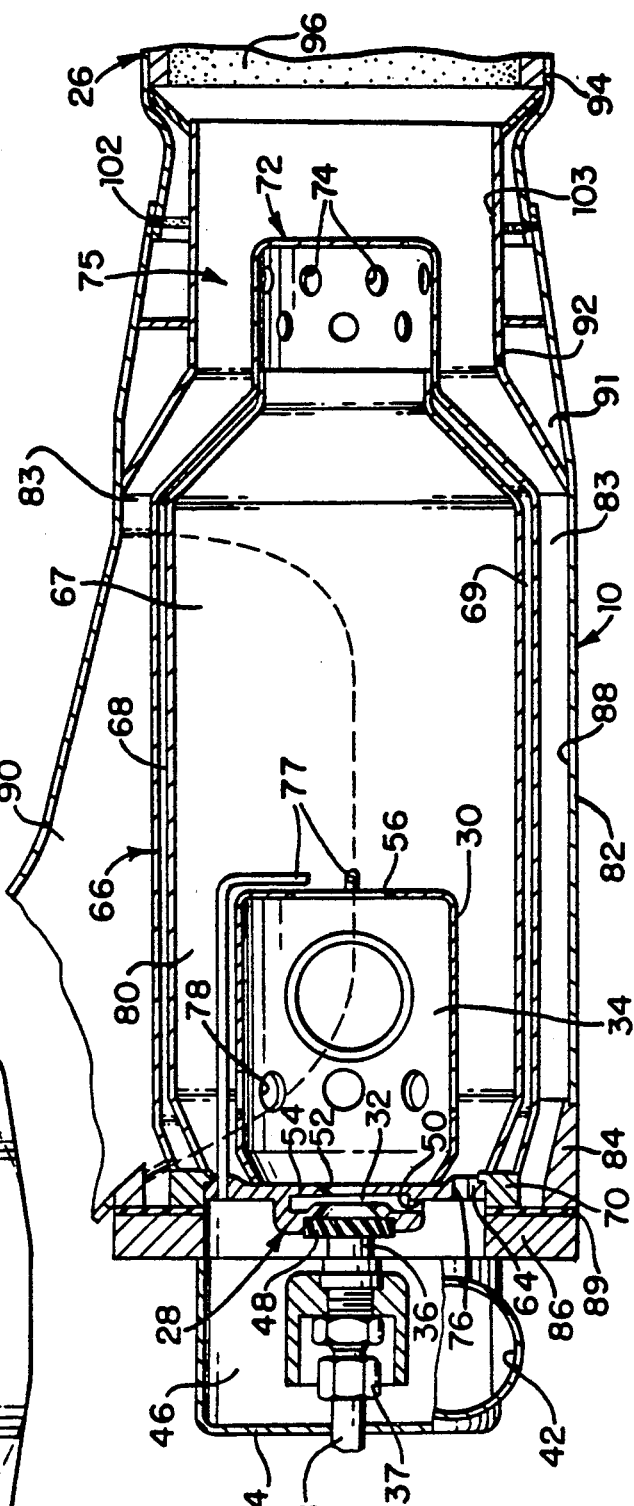

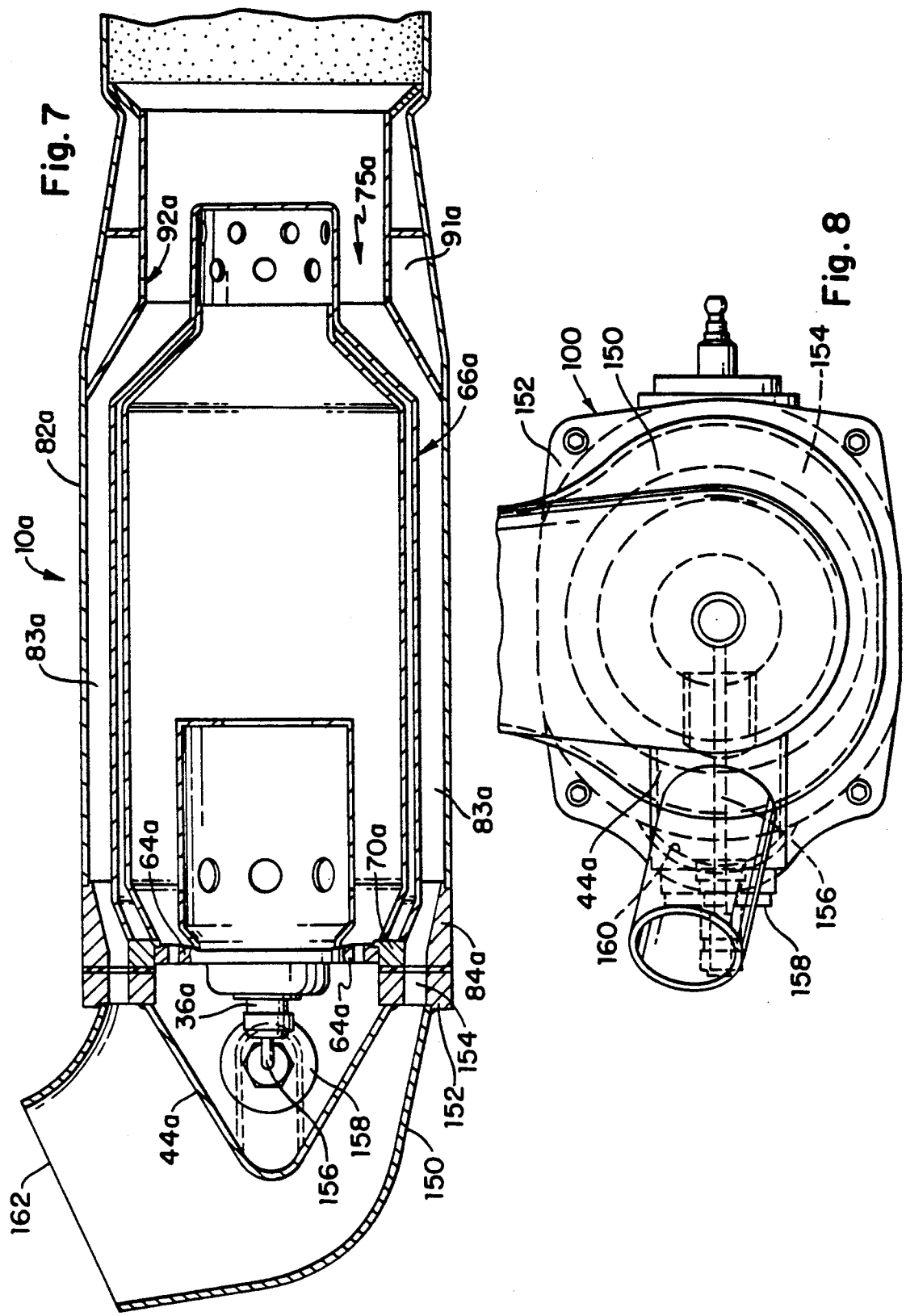

BURNER FOR HEATING GAS STREAM

BACKGROUND OF THE INVENTION

1. Field of the Invention

This invention relates to an internal combustion engine exhaust treatment apparatus and, in particular, to a fuel fired burner for heating an exhaust gas stream.

2. Description of the Relevant Art

Advancement in emission technologies for internal combustion engines have resulted in significantly lowered total engine emissions. In general, automotive emissions applications employ an exhaust mounted catalytic treatment device for reducing regulated exhaust constituents such as Hydrocarbons (HC), Carbon Monoxide (CO), and Oxides of Nitrogen ($NO_x$) in the engine exhaust prior to its release to the atmosphere.

The catalyst treatment devices, or catalytic converters, rely on the latent heat of the exhaust gas to become catalytically active following a cold start. Initiation of catalyst activity occurs at the light-off temperature and is typically in the area of 400 degrees C. A vehicle may require 75–100 seconds or more before the engine exhaust supplies sufficient heat to reach catalyst light-off. The need for early supplemental heat at the catalytic converter prior to efficient emission conversion suggests that significant vehicle tailpipe emissions of regulated constituents occur prior to converter light-off. Accordingly, in order to reduce cold-start emissions, it is desirable to provide an additional heat source at, or before, engine start-up, which will promote faster heating of the converter and, therefore, a shorter time to optimal catalyst efficiency.

Several technologies have been considered for the preheating of catalytic converters. Electrically heated converters, which use an engine driven electrical system to heat elements in the converter, or the catalyst support itself in the case of metal supports, have been proposed. The heat output of the electrically heated units is directly related to the electrical input. In order to achieve the desired, rapid heating of the catalyst support, significant power must be supplied by the electrical system.

Burner systems, to which the present invention is directed, have also been considered for achieving rapid heating. Although not suffering from the drawbacks of electrically heated units, such systems require a burner, a fuel system, and an ignition system along with the related complexity and packaging problems associated with such systems. In addition, rapid, reliable ignition of the burner, burner control, and adequate mixing of the burner output with the engine exhaust have historically been problematic.

SUMMARY OF THE INVENTION

Accordingly, an object of the present invention is to provide a simplified burner design which is capable of integration into the vehicle fuel and powertrain systems thereby reducing cost and complexity and increasing reliability.

Another object of the invention is to provide a burner having a unique combustor design capable of reliable and efficient operation regardless of location in the exhaust system and under a wide range of fuel and air flow conditions.

The burner comprises a combustor head assembly having a means for mixing fuel and air, and a source of ignition for the fuel/air mixture. The fuel and air are combined and atomized in a combustor tube which is partitioned into a fuel/air mixing chamber and a primary combustion chamber. The combustor head assembly is mounted at a first end of a main combustor comprising an elongated tubular combustor chamber having a series of outlets at the second or opposite end in an area of reduced diameter. The outlets of the main combustor are placed circumferentially about the outer periphery of the tube. The result is that the output from the burner is ejected from the main combustor in a radial direction.

The main combustor is mounted at one end of a burner housing. An interlocking flange assembly retains the combustor head, the main combustor, and the burner housing together as one apparatus. Exhaust gas enters the housing upstream of the main combustor outlets and passes over the outer surface of the main combustor tube removing heat transferred through the combustor tube. The exhaust enters a reduced diameter portion, or mixing zone, in the burner housing adjacent the reduced diameter portion of the main combustor, where it is mixed with the burner output exiting the combustor outlets in a direction substantially normal to the direction of the exhaust flow. Dilution air may be added to the exhaust gas in the mixing zone, thereby ensuring maximum conversion efficiencies in the converter during the initial phase of engine operation, while the engine is running an open loop fuel control with a rich fuel/air ratio.

The burner assembly is operably connected to a catalytic converter with the exit from the burner preferably constituting the inlet of the converter. Such a configuration reduces the size of the assembly and limits the loss of heat between the burner and the converter.

Other objects and features of the invention will become apparent by reference to the following description and to the drawings.

BRIEF DESCRIPTION OF THE DRAWINGS

FIG. 4 is a side view of the burner of FIG. 2;

FIG. 5 is an end view of the burner of FIG. 2;

FIG. 7 is a side view of the burner of FIG. 6; and

FIG. 8 is an end view of the burner of FIG. 6.

DESCRIPTION OF THE PREFERRED EMBODIMENT

Figure 1:
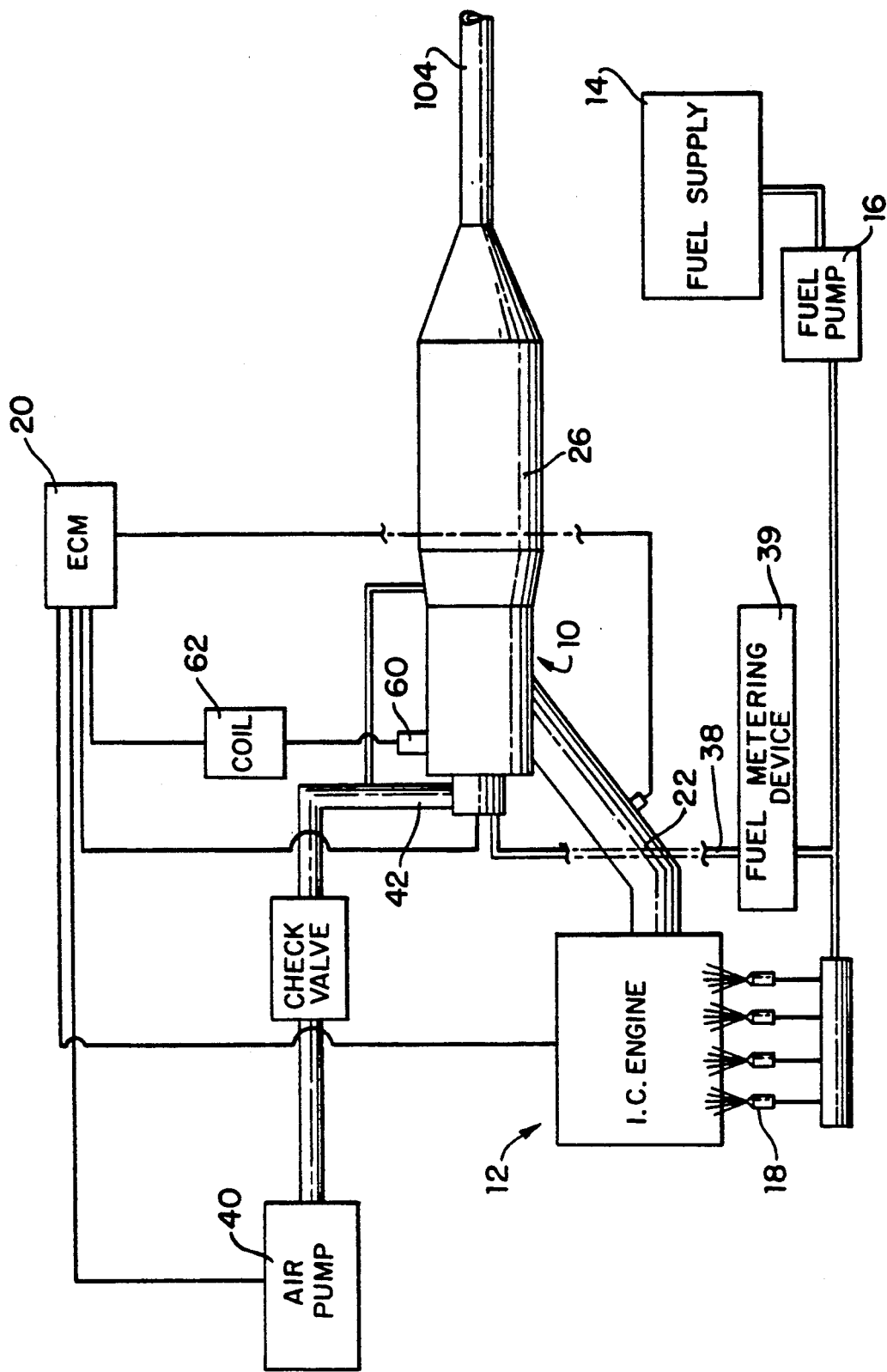
FIG. 1 is a schematic view of an internal combustion engine embodying the present invention.

FIG. 1 schematically illustrates a typical application of the exhaust burner assembly 10 of the present invention to the exhaust system of an internal combustion engine 12. The engine is supplied with fuel from a fuel system comprising fuel tank 14 and fuel pump 16 which deliver pressurized fuel to fuel distributing means, such as injectors 18. An electronic control module (ECM) 20 monitors engine parameters through sensors (not shown) and varies fuel and ignition accordingly. Exhaust exits engine 12 through exhaust conduit 22 and enters burner assembly 10. The burner is operably connected with catalytic converter 26 through which the exhaust gas passes after exiting burner assembly 10.

Figure 2:
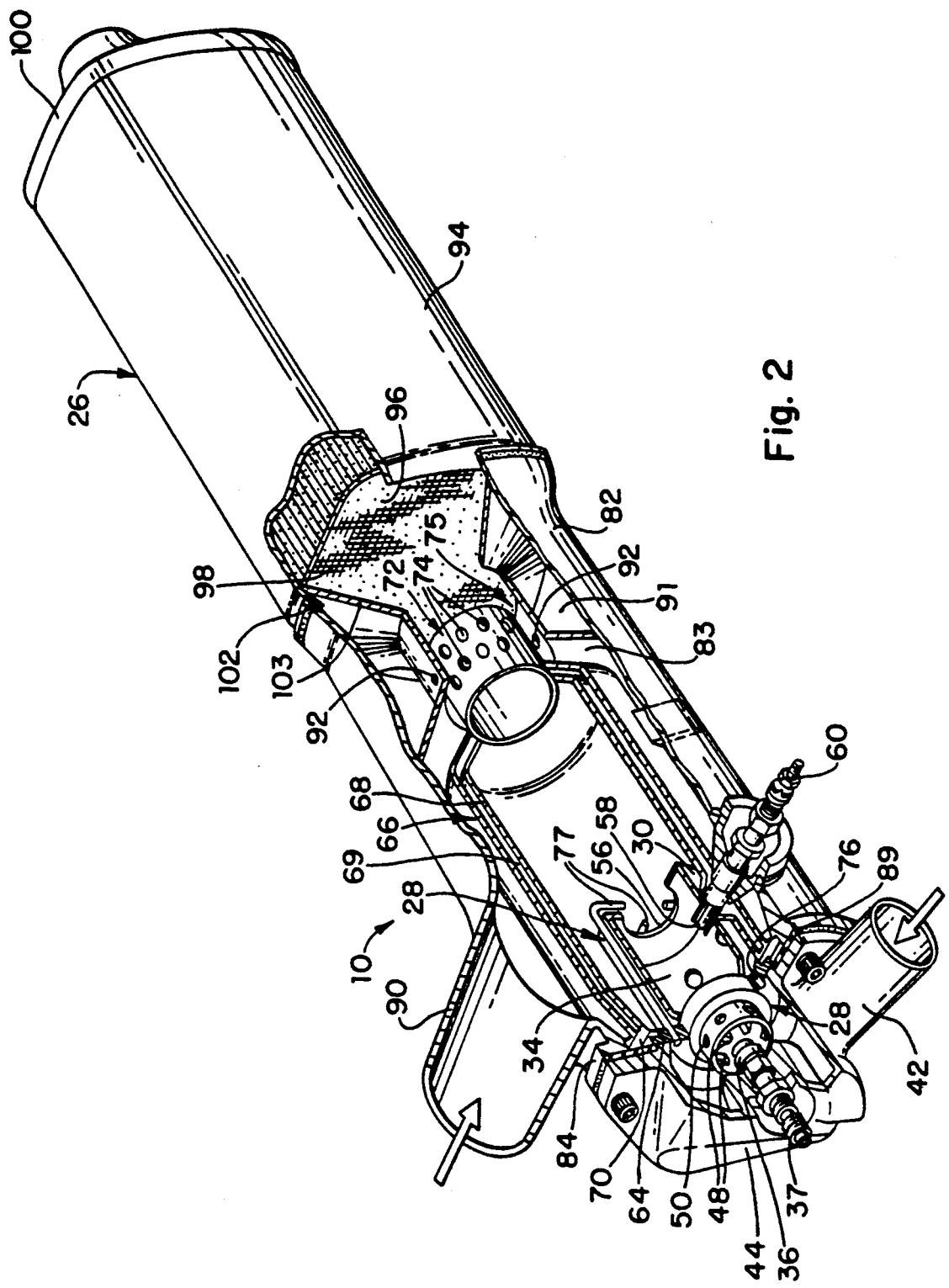
FIG. 2 is a perspective view of a first embodiment of a burner embodying features of the present invention.
Figure 3:
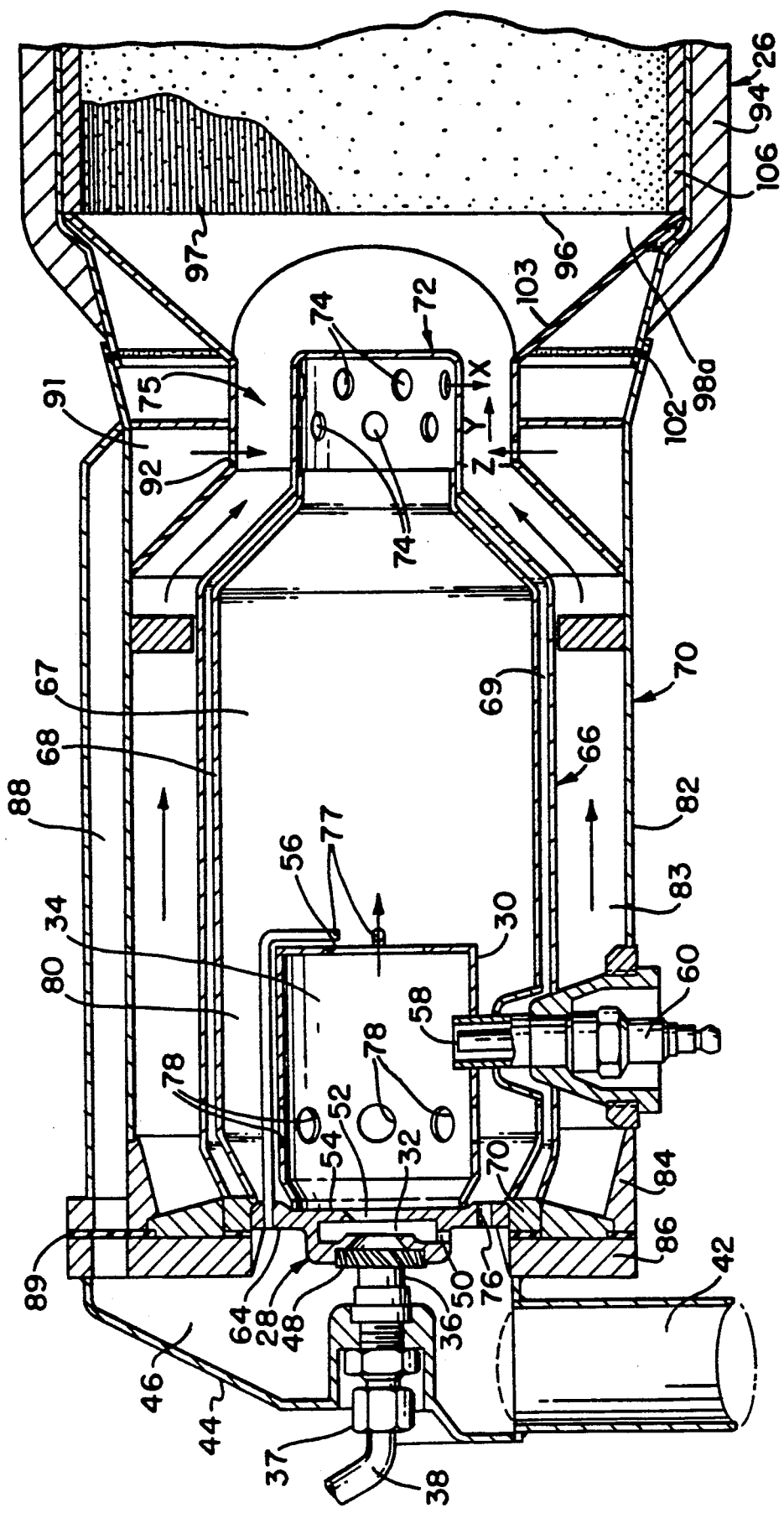
FIG. 3 is a plan view of the burner of FIG. 2.

Referring to FIGS. 2, 3, and 4, burner assembly 10 comprises a primary combustor assembly 28. A principle component of the primary combustor 28 is the combustor tube 30 which is an axially extending tube having a fuel mixing or swirl chamber 32 located at a first end and a primary combustor chamber 34 located at the second end thereof. The fuel mixing chamber 32 includes provision for the mounting of a fuel supply means such as fuel nozzle 36.

The fuel nozzle 36 may comprise any of a number of types which are well known in the art. For example, a fuel filming nozzle, which utilizes fuel system pressure for fuel vaporization, is preferred for its robust design, which allows reliable burner operation under a wide range of fuel and air flows. The nozzle 36 is positioned so that its discharge end projects into fuel mixing chamber 32 for release of fuel therein. Nozzle 36 has an external connector 37 which is operably connected, through fuel line 38 and fuel metering device 39, to engine fuel supply 14.

Fuel metering device 39 regulates fuel from engine fuel supply 14 to a desired pressure and flow rate which is consistent with the goals of the burner control strategy, as determined by controller 20. The fuel metering device 39 may be a pulse width modulated injector or electronic fuel regulator capable of continuously modulating fuel supply relative to a predetermined input percent duty cycle. Alternately, metering device 39 may comprise a separate fuel pump (not shown). Such a configuration would be desirable in cases where burner fuel supplied from engine fuel supply would compromise that system.

Combustion air is supplied to the mixing chamber 32 via an engine driven air pump or a high performance electrical blower 40, see FIG. 1. In addition, it is contemplated that a rechargeable air pressure tank with a low volume, high pressure electric air pump may be used as an air source. The air supply is regulated to a predetermined pressure by a duty cycle controller which controls the blower volume and speed, thus controlling flow and combustor pressure.

The total amount of air delivered to the system during operation of the burner 10 is such that complete combustion of the fuel supplied by nozzle 36 into the burner is assured. Air is supplied through inlet duct 42 to housing 44, which defines an air distribution chamber 46 therein. Pressurized air from chamber 46 is conducted into swirl chamber 32 through a series of inlets having a multi-swirl path design in which the air inlets are configured to induce atomization and vaporization of the fuel prior to entering the combustor chamber 34.

As shown in FIGS. 2 and 3, air inlets 48 may be formed directly around the fuel filming head to act directly on the fuel exiting fuel nozzle 36. In addition, air inlets 50 are spaced circumferentially around the outer wall of swirl chamber 32 to induce a swirl or vortex movement of the fuel/air mixture, further enhancing fuel vaporization. To ensure reliable ignition of burner 10, air inlets 48 and 50 are sized to admit a minimum quantity of air required for initial atomization and combustion of the fuel in primary combustor chamber 34.

The fuel/air mixture exits swirl chamber 32 through outlet 52 in partition 54 separating the fuel mixing chamber 32 from the primary combustion chamber 34. The aperture 52 induces further turbulence in the fuel/air mixture, benefiting total mixing of the air and fuel as the mixture enters the primary combustion chamber 34. The chamber 34 has a substantially tubular configuration with an outlet 56 at the end remote from partition 54.

An ignitor 60 is operatively mounted to the burner assembly 10 such that the tip 58 of the ignitor 60 protrudes into the primary combustor chamber 34 for igniting the fuel/air mixture entering from swirl chamber 32. The ignitor may be of any suitable type as, for example, a spark plug shown in FIG. 3, or a glow plug as shown in FIG. 2. The ignitor 60 is connected to a coil 62, see FIG. 1, or other suitable means for energization, which is in turn operated by controller 20.

A sensor is utilized to signal the controller when a flame is present within the combustor 28. The flame sensor may be integrated with the ignitor 60, as described in related application U.S. Ser. No. 07/902,249, filed Jun. 22, 1992, (Attorney's Docket G-9670), and assigned to the assignee of this application, or it may be a separate sensor located within the combustor.

Extending about an outer portion of the combustor tube are mounting means such as flange 64. The mounting flange 64 allows the primary combustor assembly 28 to be mounted integrally within main combustor tube 68 to form main combustor assembly 66.

The main combustor assembly 66 comprises an elongated substantially tubular member 68 having an open end about which extends mounting flange 70, configured to interlockingly and sealingly engage mounting flange 64 of primary combustor assembly 28, effectively sealing the opened end of the main combustor tube 68 and supporting the primary combustor assembly 28 substantially coaxially within main combustor tube 68. As shown in the Figures, elongated tube 68 may be constructed with dual walls thereby creating an insulating air space 69 to slow the transfer of combustor heat out of the combustor tube. It is desirable to construct the components of tubular member 68 of materials having low thermal mass to minimize their effect on burner output following ignition.

The tubular configuration of main combustor 66 induces substantially axial flow to the burning fuel/air mixture exiting the primary combustor assembly 28 through outlet 56 as it moves through main combustor 66 towards the outlet end 72. Outlet end 72 comprises a reduced diameter portion having a series of circumferentially spaced burner outlets 74 which direct burner output radially outwardly, relative to the axis of the main combustor assembly 66. The reduction in diameter of the combustor tube 68 at its outlet end 72 has the effect of increasing the residence time of the burning fuel/air mixture within the main combustor portion 67 of main combustor tube 68 to ensure substantially complete combustion. In addition, the reduced diameter end portion 72 has the effect of increasing the velocity of the gases exiting the burner, a feature which will be discussed in further detail below.

Assurance of virtually instantaneous and reliable ignition of the fuel/air mixture within the primary combustor assembly may require that the initial mixture exiting swirl chamber 32 have a rich fuel/air ratio. Additional air is generally required, following ignition, to assure complete combustion of the mixture in the burner thereby minimizing any emission impact from the burner on vehicle emissions. To facilitate complete combustion within main combustor 66, air tubes 77 and air inlets 76 conduct air from distribution chamber 46, through primary combustor flange 64, into combustor tube 68. Air tubes 77 release combustion air directly at the outlet 56 of primary combustor chamber 34 providing combustion air immediately following the exit of the rich, burning fuel/air mixture from chamber 34.

The configuration of air tubes 77 provides good penetration of the combustion air into the burning fuel/air mixture. The location of tubes 75, adjacent the combustor outlet 56, significantly extends the operating range of the burner by lowering the air required for initial ignition in chamber 34 yet allowing large and immediate changes in fuel/air mixture very early in the combustion event. So as to take full advantage of the combustion area within main combustor tube 68, air entering through inlets 76 in flange 64 is mixed with a portion of the burning fuel and air mixture which is allowed to exit primary combustor chamber 34 through auxiliary outlets 78 in primary combustor tube 30, thereby promoting combustion within space 80, between the primary tube 30 and main combustor tube 63. In addition to the combustion burner and emission benefits realized by directing substantially all air required for combustion through the burner, overall burner throughput is also enhanced in that extraction of heat from the burner is facilitated.

In a manner similar to the mounting of the primary combustor assembly 28 within the main combustor tube 68 to form the main combustor assembly 66, the main combustor assembly is mounted within an outer shell, or burner housing 82, to form burner assembly 10. The burner housing 82 is of suitable configuration for support of the main combustor assembly 66 therein and for exhaust flow communication with the associated exhaust conduit 22. In addition, housing 82 has provision for operable communication with catalytic converter 26 at the outlet end thereof.

As with the primary and the main combustor tubes, the housing 82 has a first open end with a mounting flange 84 extending about the perimeter thereof. The flange 84 is configured to cooperate with the mounting flange 70 of the main combustor tube 68 to support the main combustor assembly 66 within the housing. Air distribution housing 44 has a mating surface or retaining flange 86, which is configured to sealingly engage burner housing flange 84, main combustor flange 70, and primary combustor flange 64, and to rigidly support the individual components relative to one another. Fastening means, such as bolts 87, may be used to assemble the components into burner assembly 10, and sealing means, such as gaskets 89, assure leaktight seals at component interfaces.

Exhaust from engine 12 is conducted into burner housing 82 upstream of main combustor outlets 74 through an inlet 90 operably connected with exhaust conduit 22. As the exhaust enters burner 10, it moves axially through the housing 82 in the exhaust flow space 83, defined between the housing wall and main combustor, picking up any heat transferred through the main combustor tube walls.

In a manner similar to the main combustor tube 68, the burner housing cross section is reduced adjacent to the outlets 74 of the main combustor 66 to form a mixing zone 75. In mixing zone 75, burner output exiting the main combustor tube 68 through outlets 74, is thoroughly mixed with the exhaust flow due to the flow direction of the burner output which has a substantially normal component X relative to the direction of the exhaust flow Y, as represented by arrows x and y, shown in FIG. 3, respectively.

Additional dilution air, beyond that supplied to main combustor 68 through air tubes 77 and air inlets 76, may be required in the exhaust stream entering the catalytic converter to provide the oxygen needed to assure the best possible conversion efficiency from the catalyst. In the case of burner operation, this conversion efficiency will normally be required while the engine is operating in an open loop fuel control mode with a rich fuel/air ratio.

In the embodiment shown, the air distribution chamber 46 of housing 44 supplies dilution air through conduit 88 in burner housing 82 to distribution manifold 91 which extends circumferentially about the reduced diameter portion of the housing. Dilution air outlets 92 may be spaced about the reduced diameter portion of the exhaust gas passage and are configured to inject the dilution air radially inwardly relative to the axis of the burner assembly 10 into mixing zone 75. In other words, the dilution air is injected into the exhaust gas stream passing through the burner mixing zone 75 in a direction having a substantially normal component Z to the direction of exhaust gas flow Y, as illustrated by the flow arrow z in FIG. 3, thus assuring a high degree of mixing efficiency.

Downstream of burner assembly 10 is a catalytic converter 26. The converter may be positioned at any location downstream of the burner; however, maximum heating efficiency will be realized when the converter is integral with the burner assembly 10, as illustrated. The converter is provided with a housing 94 having a catalyst support 96 mounted therein. The shell may be constructed as a one piece tubular member having inlet and outlet end portions 98, 100 as shown in FIG. 2, or as a multi-piece clamshell-type unit with integral inlet and outlet end pieces such as inlet 98a, as shown in FIG. 3.

Inlet and outlet openings are configured to facilitate attachment of the converter to the burner assembly, as by welding at 102 or other mechanically secure means, and to the associated exhaust system 104 downstream of the unit, establishing a path for exhaust flow from the associated exhaust conduit 22, through the burner/converter assembly, to the exhaust system 104. As shown in FIGS. 2 through 4, an inlet heat shield 103 is provided in the inlet area to reduce thermal loss between the burner outlet and the catalyst support 96.

The catalyst and associated support may be of any material and construction suitable for use in an internal combustion engine exhaust system for the conversion of regulated constituents in the exhaust gas. Suitable support materials may include, for example, monolithic ceramic structures or metal structures. In the embodiment shown, the catalyst support 96 is a monolithic ceramic structure of honeycomb configuration so as to provide parallel axially extending channels 97 through which exhaust gas passes. A catalyst coating on the channel walls reacts with particular exhaust constituents as the gas passes therethrough. To minimize the effects of the differing coefficients of thermal expansion, a flexible support material 106 may be disposed between the catalyst support 96 and the converter shell 26. The material will vary, dependent upon the particular catalyst support utilized, and may also be extended into the end cone areas to provide thermal insulation when desirable.

The dimensions of burner housing 82 must take into consideration exhaust flow and exterior space requirements of the particular application. In the embodiment of the burner assembly shown in FIGS. 2 through 5, for example, the burner exhaust inlet 90 is oriented in a Y-configuration which allows the burner assembly to be operably mounted to the exhaust downpipe from the engine exhaust manifold.

Figure 6:
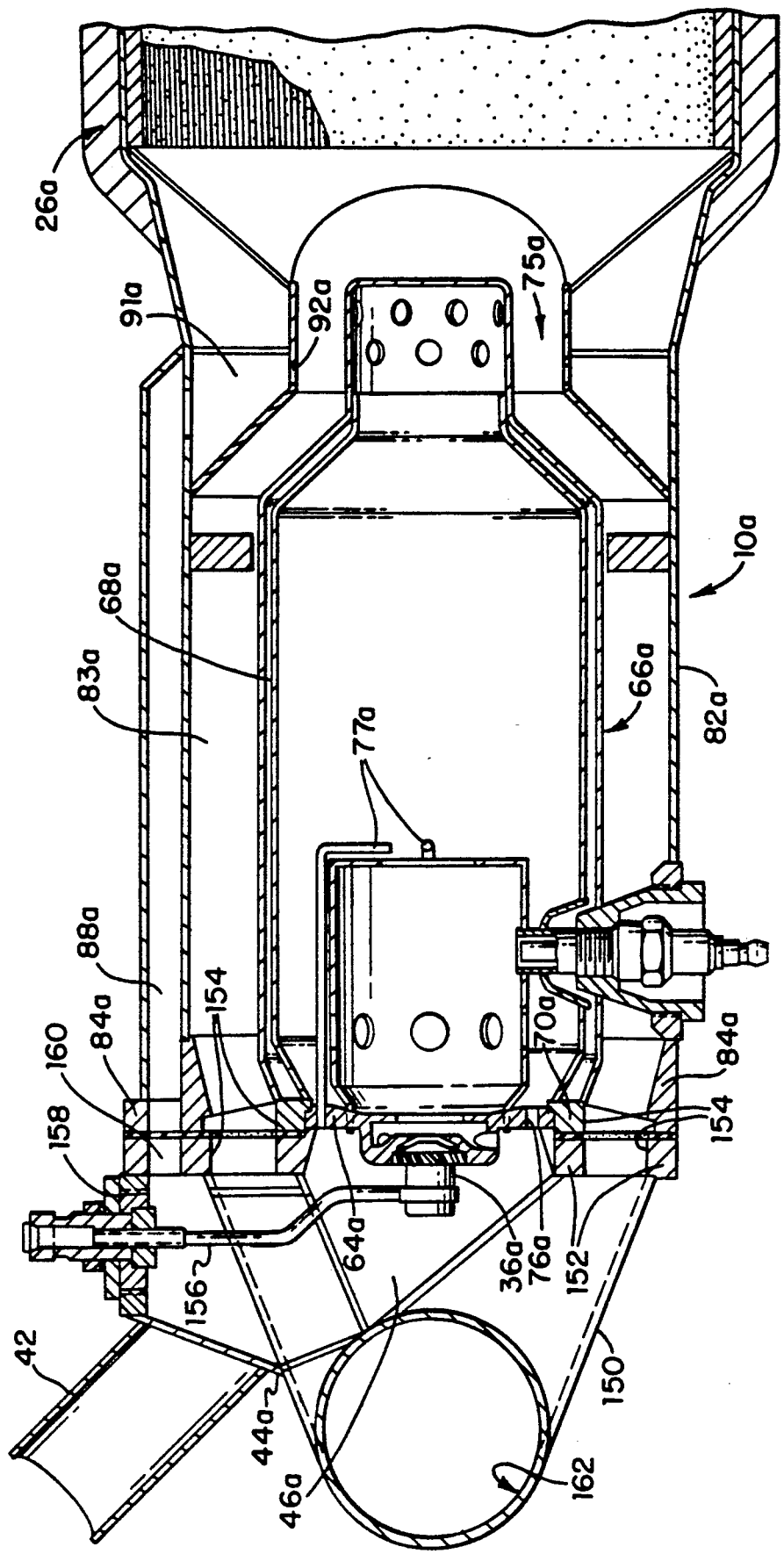
FIG. 6 is a plan view of a second embodiment of a burner embodying features of the present invention.

In instances where under-vehicle space constraints dictate a location other than directly rearwardly of the engine, it is preferred to utilize an embodiment of the burner, such as that shown in FIGS. 6 through 8, in which like features of those described in the previous embodiment are designated by similar numbers having the suffix "a". The burner, designated generally as 10a, has a housing 82a constructed without an inlet of the type described above. Burner 10a utilizes an exhaust inlet housing 150 having a mounting surface or retaining flange 152, which is configured to sealingly engage burner housing mounting flange 84a, main combustor mounting flange 70a, and primary combustor mounting flange 64a to rigidly support these components relative to one another thereby replacing the air supply housing of the prior embodiment in this task.

Exhaust air entering housing 150 is conducted into burner housing 82a through exhaust inlets 154 passing through retaining flange 152 and burner housing mounting flange 84a to operably connect with burner housing exhaust flow space 83a. Exhaust gas entering housing 82a travels axially therethrough about the exterior of the main combustor assembly 66a, picking up heat expelled by the combustor assembly, as it moves toward mixing zone 75a. The in-line configuration of the inlet housing 150 provides for more uniform mixing of engine exhaust and burner output in zone 75a due to substantially coaxial flow of the exhaust gas, which may not be the case in the burner with a "Y" configured inlet as shown in FIGS. 2 through 5.

In the present embodiment, air distribution housing 44a is an integral part of the exhaust inlet housing 150 and includes integral fuel supply line 156 and associated fuel attachment means 158 for supplying fuel to the fuel nozzle 36a. Excess dilution air, beyond that supplied within combustor 68a by air inlets 76a and air tubes 75a, may be supplied to the exhaust stream entering catalytic converter 26a through outlets 92a from dilution air distribution manifold 91a which is supplied through conduit 88a. Dilution air enters conduit 88a through opening 160 extending from air distribution chamber 46a through flanges 152 and 84a.

While the exhaust inlet housing 150 is shown in the Figures having an angled inlet 162, the inlet may be oriented in any number of directions to satisfy particular design requirements.

The burner for heating a gas stream of the present invention provides an efficient, burner based heating system which is designed to provide reliable ignition, and low emission output in a manner which assures thorough mixing of the output with the gas stream.

The present invention discloses an exhaust gas heater having a unique burner configuration which assures minimal combustor heat loss by placing the combustor within the exhaust gas flow stream. The burner has a unique flange arrangement for mounting the combustor coaxially within the burner housing and a multi-part combustor assembly which minimizes exhaust flow interference with burner operation thereby assuring substantially instantaneous and reliable burner ignition and operation.

In addition, the disclosed burner utilizes a unique mixing zone wherein the burner output is mixed with the exhaust gas flow. Complete mixing of these components is assured through the injection of the burner output into the exhaust flow in a direction having a normal component to the direction of the exhaust flow in a narrow throat area or mixing zone prior to entering the catalytic converter.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiment of the invention in which an exclusive property or privilege is claimed are defined as follows:

1. A burner for heating an exhaust gas stream comprising a dual chamber combustor head having a first, fuel/air mixing chamber and a second, primary combustor chamber, said chambers separated by a partition and operably connected through an opening in said partition, said fuel/air mixing chamber having means for the introduction of fuel and air thereto, said air supply means comprising a series of air inlets positioned about said fuel/air mixing chamber and configured to induce a vortex flow therein, ignition means in said primary combustion chamber operable to ignite fuel and air entering said chamber from said fuel/air mixing chamber, said primary combustion chamber comprising an elongated tubular member having a first end comprising said partition and a second end having an outlet through which said burning fuel/air mixture exits said primary combustor, a main combustor comprising a second, elongated tubular member having a first, open end configured to support said primary combustor head in coaxial alignment within said second, elongated tubular member, a main combustion zone wherein said burning fuel/air mixture exiting said primary combustor is mixed with additional combustion air and undergoes substantially complete combustion and a second, exit end having a reduced diameter portion and a series of main combustor outlets positioned circumferentially thereabout, said outlets configured to direct burner output from said combusted fuel/air mixture radially outwardly relative to the axis of said main combustor tube to disperse said burner output, a burner housing comprising a third, elongated member having a first, open end configured to support said main combustor in coaxial alignment within said third, elongated tubular member, said main combustor and said third, elongated tubular member cooperating to define an exhaust gas space therebetween, a second/ outlet end operably attachable to an exhaust system, and an exhaust gas inlet in communication with an exhaust gas source, said inlet positioned to introduce exhaust gas into said exhaust gas space, upstream of said main combustor outlets wherein said exhaust gas travels through said exhaust gas space to a mixing zone comprising a reduced diameter portion of said burner housing adjacent to said reduced diameter portion of said second end of said main combustor and past said combustor outlets located in said mixing zone where burner output from said combusted fuel/air mixture is mixed therewith, said burner output having a directional flow component which is substantially normal to the direction of exhaust flow through said mixing zone thereby promoting mixing of said output with said exhaust gas.

2. A burner for heating an exhaust gas stream, as defined in claim 1, further comprising a dilution air manifold disposed adjacent said reduced diameter portion of said burner housing and having air outlets in communication with said mixing zone for injecting dilution air required for desired catalyst activity into said exhaust stream.

3. A burner for heating an exhaust gas stream, as defined in claim 1, said additional combustion air supplied to said main combustor through an air inlet in said first end of said main combustor and an air tube communicating with an air inlet in said first end of said main combustor and extending axially into said main combustor to deliver combustion air adjacent said outlet in said primary combustor.

* * * * *